United States Patent [19]
Thurston

[11] 3,977,719
[45] Aug. 31, 1976

[54] APPARATUS FOR COVERING OPEN-BODIED VEHICLES

[76] Inventor: Howard E. Thurston, Union Road, Stratham, N.H. 03885

[22] Filed: Apr. 28, 1975

[21] Appl. No.: 572,405

[52] U.S. Cl. .............................. 296/98; 294/19 R; 294/24
[51] Int. Cl.² ........................................... B60J 7/02
[58] Field of Search ............... 296/98, 100; 160/26, 160/27, 265, 238; 294/2, 19 R, 24

[56] References Cited
UNITED STATES PATENTS

| | | | |
|---|---|---|---|
| 890,875 | 6/1908 | Samuel | 296/98 |
| 2,063,583 | 12/1936 | Christy | 294/19 R X |
| 2,898,147 | 8/1959 | Horner | 296/98 |
| 3,146,824 | 9/1964 | Veilleux | 296/98 X |
| 3,397,009 | 8/1968 | Landenberger | 296/100 |
| 3,477,757 | 11/1969 | English | 294/19 R |
| 3,498,666 | 3/1970 | Harrawood | 296/98 X |
| 3,549,197 | 12/1970 | Sibley | 296/100 |
| 3,583,057 | 6/1971 | Kolozsvary | 160/238 X |
| 3,936,088 | 2/1976 | Williams | 294/19 R |

FOREIGN PATENTS OR APPLICATIONS

| | | | |
|---|---|---|---|
| 604,006 | 4/1926 | France | 296/98 |
| 319,345 | 3/1920 | Germany | 294/2 |
| 491,198 | 8/1938 | United Kingdom | 296/98 |

Primary Examiner—Robert J. Spar
Assistant Examiner—Winston H. Douglas
Attorney, Agent, or Firm—Thomas N. Tarrant

[57] ABSTRACT

A cover for open-bodied vehicles to cover loads during transportation having a reel carried in an assembly removably securable to the front of an open vehicle body, a rod longer than the width of the vehicle body, a tarpaulin at least as wide and as long as the open body connected at one end to the rod and at the other to the reel, removable hooks securable to the back of the vehicle body for holding the rod with the tarpaulin extended, a crank connected to the reel for reeling the cover and a hand implement having a device mating with said crank for manual operation of the reel and a tool for connection to said rod so as to manually transport the tarpaulin from the reeled condition out over the open body.

6 Claims, 3 Drawing Figures

APPARATUS FOR COVERING OPEN-BODIED VEHICLES

BACKGROUND OF THE INVENTION:

1. Field of the Invention:

The present invention relates to flexible removable covers for open-bodied trucks.

2. Description of the Prior Art:

In recent years, safety and environmental conscious lawmakers have produced a multitude of ordinances requiring vehicles transporting loads on the public roads to provide covers so as to prevent material from leaving the vehicle causing public nuisance and hazard.

At first this was handled mostly by lashing tarpaulins over the loads. This procedure was time consuming and it was not long before products started appearing on the market to reduce the time and labor involved. Arrangements of varying complexity have appeared. A common arrangement uses heavy springs at the back working in opposition to a winch either manual or power driven at the front. Strictly manually operated arrangements have usually suffered from a necessity of the operator climbing up and down from the vehicle with many of the difficulties of the simple lashed tarpaulin. Most of the presently popular arrangements require substantial installation expense and are not readily transferred between trucks. Transfer between trucks becomes a particular problem when a trucker replaces a truck and must either buy a new cover apparatus complete with installation costs or must resort to the expense of removing the apparatus from the old vehicle and still run the full installation cost again.

SUMMARY OF THE INVENTION

In accordance with the present invention a manually operated truck cover is provided which the operator can manipulate entirely from the ground. To this end, cover material is connected at one end to a pipe and at the other to a winch mounted at the front of a truck body. A hand implement long enough to extend from an operator on the ground to the cover equipment atop the truck has a connector at one end for connection to the pipe so that the pipe and the cover material connected to it can be lifted and moved from the ground. A connector at the other end of the implement mates with a crank on the winch for reeling up the cover. In covering the truck body, hooks at the back of the truck receive the pipe to anchor it while the winch is tightened and locked to tauten the cover. Since no power connections are required and the stresses on the supporting parts are low, the supporting parts are readily secured to the truck body with set bolts.

Thus it is an object of the invention to provide a novel cover for open-bodied trucks that is completely manually operable from the ground.

Further objects and features of the invention will become apparent upon reading the following disclosure together with the drawing.

DESCRIPTION OF THE PREFERRED EMBODIMENT:

One of the purposes of the present invention is to provide the means for complying with statutes such as: "...no person shall operate on any highway any open vehicle loaded with earth, sand, asphalt, stone, gravel, or other particulate substance unless said vehicle is equipped with and said load is covered and secured by a close-fitting tarpaulin which prevents the escape of any substance from said load onto the highway." [RSA249:51II (New Hampshire Statutes)]

Figure 1:
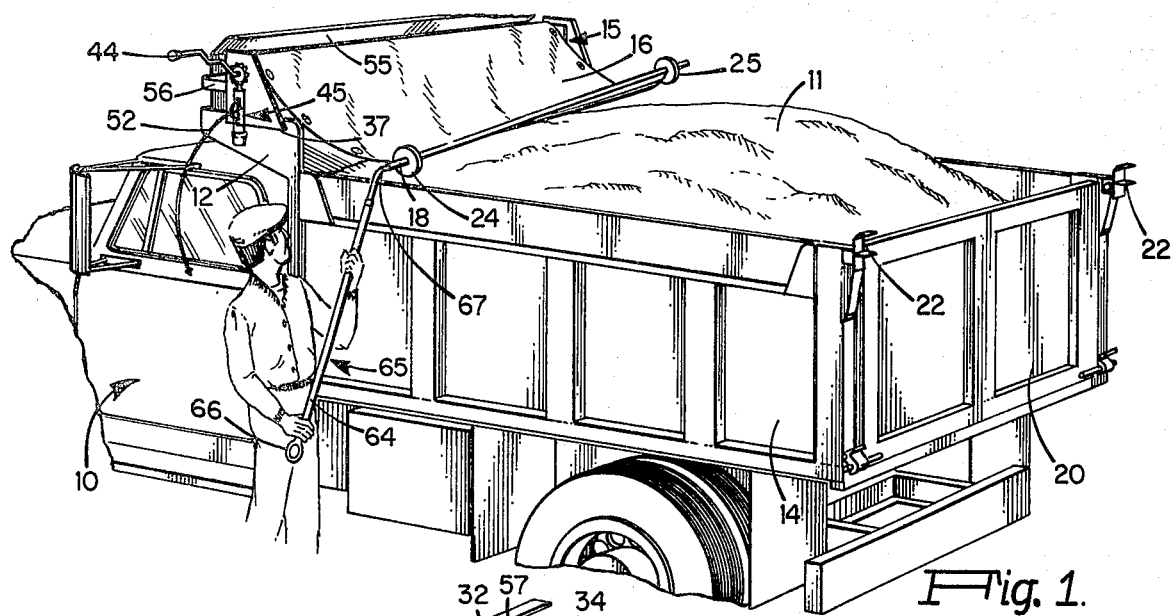
FIG. 1 is a view in perspective of a truck having the inventive cover showing an operator moving the cover across the load.

FIG. 1 depicts such a vehicle in the form of dump truck 10 carrying load of sand 11. Secured to cab shield 12 of truck body 14 is winch and reel assembly 15 for carrying a roll of tarpaulin 16.

One end 17 of tarpaulin 16 is hemmed about a length of rod, depicted as pipe 18, a few inches longer than the width of truck body 14. Depicted truck body 14 has tailgate 20. Clamped adjacent to tailgate 20 are two hooks 22 with hook openings facing to the rear for receiving and holding pipe 18.

Pipe 18 is suitably three-quarter inch galvanized electrical conduit tubing with discs 24 and 25 secured near each end outside of tarpaulin 16. Discs 24 and 25 may take many forms but are depicted as metal discs, six inches in diameter with collars and setscrews holding them to pipe 18. Small rubber tires friction fitted to pipe 18 are also suitable. Other discs or donut shapes of metal, plastic or rubber may be secured to pipe 18 by any conventional means such as clamping, screwing, welding or cementing. Removable discs 24 and 25 are convenient when necessary to replace the tarpaulin. The disc diameter is not critical but less than three inches would probably not serve the purpose in most cases and over twelve inches would start to become unnecessarily cumbersome.

Hooks 22 may be mounted on any suitable surface at the top rear of an open vehicle body. Similarly, reel assembly 15 need not be mounted on a cab shield, but may be mounted toward the front of most any open vehicle body.

Figure 2:
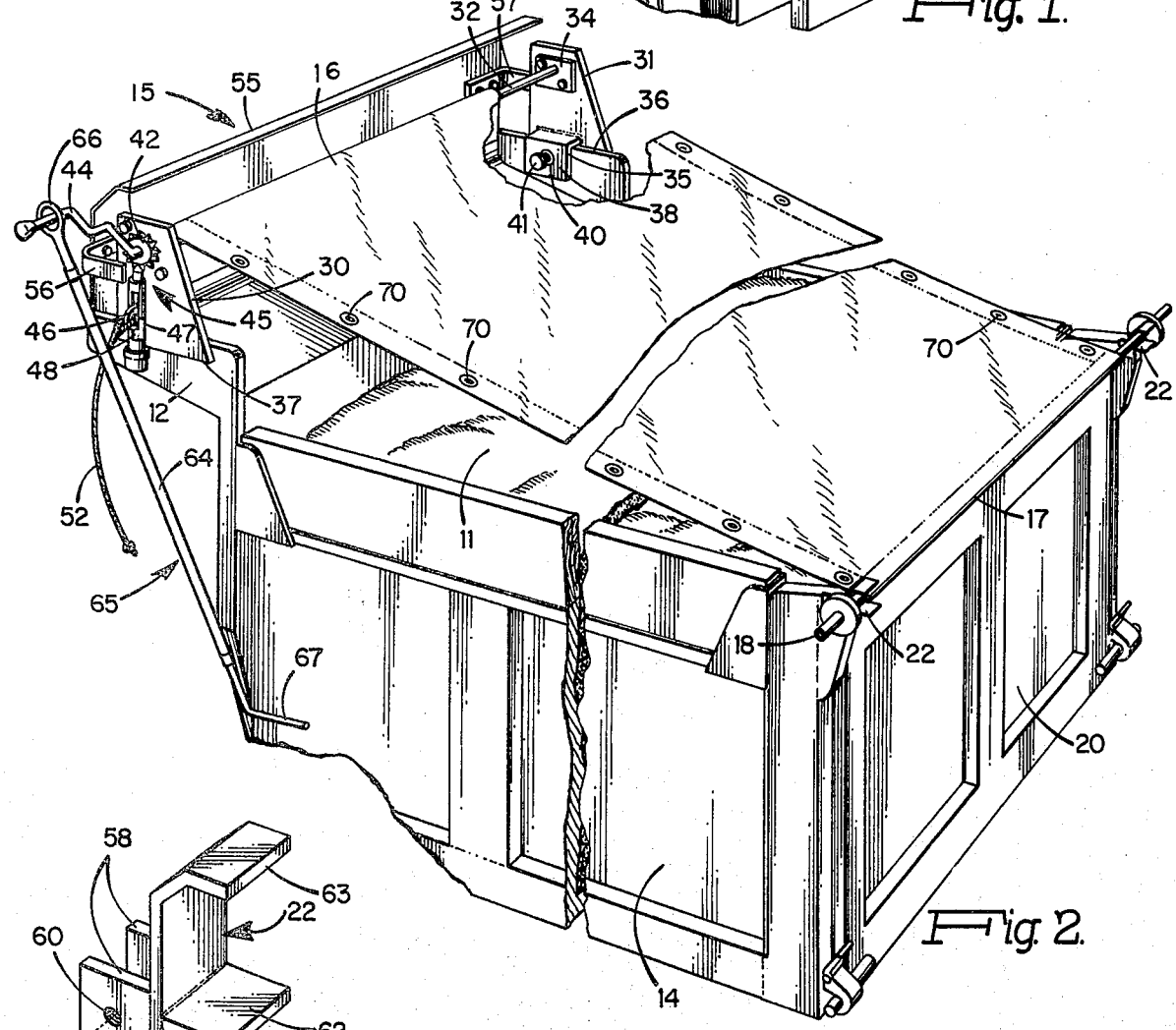
FIG. 2 is a perspective view of part of an open vehicle body with a winch, according to the invention, mounted on the body and the hand implement of the invention mated to the winch handle.

Reel assembly 15, as depicted in FIG. 2, is constructed from side panels 30 and 31 holding reel shaft 32 by means of bearings 34. Angle iron 35, welded to the inside of panel 31, is arranged to rest on top edge 36 of cab shield 12. Portion 37 of each of panels 30 and 31 extends outside and below top edge 36. Side 38 of angle iron 35 extends downwardly on the inside of cab shield 12 to approximately the level of portion 37. Threaded aperture 40 is provided centrally in side 38 for a setbolt, 41, to anchor panel 31 to the cab shield. Threaded aperture 40 may be reinforced by a threaded collar or nut welded to side 38. A similar arrangement on the inside of panel 30 is not shown due to the arrangement of views. Reel shaft 32 extends through panel 30.

On the outside of panel 30, sprocket 42 is fixedly mounted on shaft 32. Outside of sprocket 42, crank 44 is connected to the end of shaft 32. Mounted vertically on panel 30 below sprocket 42 is spring bolt 45. Spring bolt 45 is a bolt 46 sliding in a cylinder 47 backed up by a coil spring (not shown). Cylinder 47 has longitudinal slot 48 with a right angle locking turn while bolt 46 is integral with a looped projecting lever riding in slot 48. The tip of bolt 46 is machined to match the intertooth recesses of sprocket 42. Cord 52 is secured in bolt 46 to enable releasing and retracting of bolt 46 from the ground or other short distance.

Windscreen 55 is mounted from panels 30 and 31 by straps 56 and 57. Windscreen 55, suitably of sheet metal or plastic, is a conventional shield to protect tarpaulin 16 from direct wind.

Figure 3:
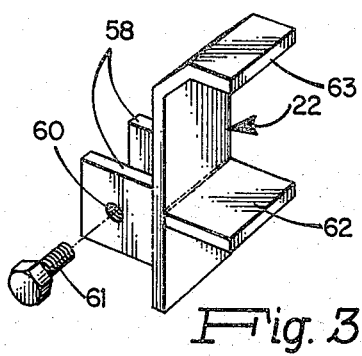
FIG. 3 is a detail in perspective of one of the rear hooks showing the mounting means.

FIG. 3 details one of hooks 22. The depicted hook 22 is welded from strap iron with two ears 58 extending forward and parallel so as to fit on either side of projecting portions of body 14. (Forward, backward, front and rear in the present description are always relative to a vehicle upon which the apparatus of the invention would be mounted). The outside one of ears 58 contains threaded aperture 60 for receiving setbolt 61. Setbolt 61 thus serves to clamp hook 22 to the rear of body 14. While ears 58 lie in a normally vertical plane, two rearwardly extending hook fingers 62 and 63 lie in a normally horizontal plane with finger 63 above and substantially parallel to finger 62.

Implement 65 (depicted in FIG. 2 and partially in FIG. 1) is an accessory that makes it possible to perform all manual operations from a short distance, i.e., the ground. Thus implement 65 has shaft 64 having a device in the form of loop 66 at one end designed to fit over and around crank 44. On the other end, shaft 64 has tool in the form of angled inserter 67 designed to fit the inside of pipe 18. The length of implement 65 is readily made to suit the height of a given vehicle, however, about 6 feet is usually satisfactory and a range of 4 to 8 feet will cover most uses. The way in which implement 65 is made is not critical. It can be a length of pipe to which loop 66 and inserter 67 of solid metal stock are attached by welding. It may also be one integral metal bar in which loop 66 and inserter 67 are formed by bending and machining as necessary. For ease of manipulation, it has been found desirable to have inserter 67 angled at about 45° from the axis of shaft 64. Shaft 64 may be made from plastic or wood as well as metal and the device and tool may be attached by any conventional method. While a loop device and inserter tool are depicted, they are exemplary only and other usual mating arrangements are contemplated.

Although a certain amount of minimum structural strength is required in most of the parts including implement 65, there is nothing particularly critical and those experienced in the art would readily recognize the design requirements without having to resort to experiment.

Eyelets 70 are provided in usual manner along the edges of tarpaulin 16 to secure the edges of tarpaulin 16 against vehicle body 14 by suitable ties when required.

In operation, starting from a reeled-up position, inserter 67 is inserted in pipe 18 and bolt 46 is retracted and locked by cord 52. Reel shaft 32 is then free to revolve. As depicted in FIG. 1, implement 65 is next utilized to lift pipe 18 and the operator walks toward the rear with implement 65 carrying pipe 18 which the operator places in hooks 22. The operator then withdraws inserter 67 and reverses implement 65 so as to place loop 66 over crank 44. Implement 65 is then used to rotate crank 44 counterclockwise until tarpaulin 16 is stretched tight, whereupon a quick yank on cord 52 locks sprocket 42 with bolt 46. If necessary, the sides of tarpualin 16 may be secured down against the truck body using eyelets 70.

For rewinding, bolt 46 is again retracted by means of cord 52 and inserter 67 is inserted in pipe 18 to remove pipe 18 from hooks 22. Using implement 65, pipe 18 is place across the open vehicle body so that discs 24 and 25 lie outside the body edges. Implement 65 is again reversed and loop 66 applied to crank 44 to reel-up tarpaulin 16. Discs 24 and 25 assure that pipe 18 tracks properly so that tarpaulin 16 winds straight. When tarpaulin 16 is fully reeled, bolt 46 is released against sprocket 42 so that tarpaulin 16 is locked in the reeled condition.

While the invention has been described with respect to a specific embodiment, it is readily adapted to many types of vehicles and the materials, sizes and shapes as well as the places and means for mounting are subject to considerable variation without departing from the inventive concept. Thus it is intended to cover the invention as set forth in the full scope of the appended claims.

I claim:

1. Apparatus for covering open-bodied vehicles comprising:
   a. a reel assembly mountable on the front of an open vehicle body, said reel assembly having a manually operable reeling crank;
   b. a tarpaulin mounted for reeling on said reel assembly and extendable to cover said body;
   c. a rigid hollow pipe secured to the extendable end of said tarpaulin;
   d. retaining elements mounted at the rear of said body for securing said pipe when said tarpaulin is in the extended condition; and
   e. an elongated rigid manual implement 4 to 8 feet long comprising a shaft, a solid bar extending at one end of said shaft and bent at an angle with respect to the axis of said shaft for insertion into a hollow end of said pipe to provide a rigid connection to said pipe, and a loop connected to said shaft and spaced longitudinally away from said bar, said loop shaped to fit over said crank whereby said implement may be used to manually lift said pipe and move the extendable end of said tarpaulin and also to operate said crank for reeling up said tarpaulin.

2. Apparatus for covering open-bodied vehicles according to claim 1 wherein said reel assembly and said retaining elements include adjustable clamping devices for removably securing them to a vehicle body.

3. Apparatus for covering open-bodied vehicles according to claim 1 wherein said pipe further comprises two discs connected one near each end of said pipe such that with said rod lying across the width of a vehicle body, said discs fall just outside the body edges whereby said discs cause said pipe to track when said tarpaulin is reeled up.

4. Apparatus for covering open-bodied vehicles according to claim 1, said bar is bent at substantially a 45° angle with respect to the axis of said shaft.

5. Apparatus for covering open-bodied vehicles according to claim 1 wherein said reel assembly comprises a reel shaft supported by first and second side panels, a sprocket secured to said reel shaft adjacent said first panel, a spring bolt mounted on said first side panel so as to bear against and engage the intertooth recesses of said sprocket under spring pressure to prevent rotation of said reel shaft, a locking arm integral with said bolt for locking said bolt in a retracted position and a cord secured to said arm for retracting said bolt to a locked position and releasing said bolt against said sprocket from a distance.

6. Apparatus for covering open-bodied vehicles according to claim 5 wherein said reel assembly and said retaining elements include adjustable clamping devices for removably securing them to a vehicle body and said pipe further comprises two discs, 3 to 12 inches in diameter, connected one near each end of said rod such that with said pipe lying across the width of a vehicle body, said discs fall just outside the body edges whereby said discs cause said pipe to track when said tarpaulin is reeled up.

* * * * *